United States Patent
Taylor et al.

(10) Patent No.: US 7,460,468 B2
(45) Date of Patent: Dec. 2, 2008

(54) METHOD AND SYSTEM FOR AUTOMATICALLY TRACKING THE REROUTING OF LOGICAL CIRCUIT DATA IN A DATA NETWORK

(75) Inventors: William Taylor, Duluth, GA (US); David Massengill, Covington, GA (US); John Hollingsworth, Covington, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 730 days.

(21) Appl. No.: 10/829,584

(22) Filed: Apr. 22, 2004

(65) Prior Publication Data

US 2005/0238007 A1    Oct. 27, 2005

(51) Int. Cl.
*G01R 31/08* (2006.01)
*H04L 12/28* (2006.01)
*H04L 12/56* (2006.01)

(52) U.S. Cl. .................. 370/216; 370/351; 370/395.32
(58) Field of Classification Search ................. 370/389, 370/216, 351, 352, 353, 354, 355, 356, 357
See application file for complete search history.

(56) References Cited

U.S. PATENT DOCUMENTS

| | | | | |
|---|---|---|---|---|
| 5,894,475 A | * | 4/1999 | Bruno et al. ................. | 370/389 |
| 6,108,300 A | * | 8/2000 | Coile et al. .................. | 370/217 |
| 6,167,025 A | * | 12/2000 | Hsing et al. .................. | 370/216 |
| 6,181,679 B1 | * | 1/2001 | Ashton et al. ................ | 370/244 |
| 6,424,629 B1 | * | 7/2002 | Rubino et al. ............. | 370/241.1 |
| 6,826,184 B1 | * | 11/2004 | Bryenton et al. ......... | 370/395.1 |
| 2004/0125776 A1 | * | 7/2004 | Haugli et al. ................ | 370/338 |
| 2005/0013242 A1 | * | 1/2005 | Chen et al. .................. | 370/228 |
| 2007/0168200 A1 | * | 7/2007 | Shimizu ......................... | 705/1 |

* cited by examiner

*Primary Examiner*—Chirag G Shah
*Assistant Examiner*—Ashley L Shivers
(74) *Attorney, Agent, or Firm*—Hanley, Flight & Zimmerman, LLC (57) ABSTRACT

A method and system are provided for automatically tracking the rerouting of logical circuit data in a data network. Current reroute statistics are automatically generated upon the rerouting of logical circuit data from one or more failed logical circuits to one or more logical failover circuits in the data network. The current reroute statistics include trap data received for the one or more failed logical circuits in the data network. The current rerouted statistics may be automatically updated upon receiving updated trap data for the failed logical circuits and the logical failover circuits in the data network. A table is generated for presenting the current and updated reroute statistics. The updated reroute statistics may be generated upon the restoration of one or more of the failed logical circuits in the data network. A billing report may then be generated following the generation of the updated reroute statistics.

26 Claims, 7 Drawing Sheets

| LOGICAL CIRCUIT ID 52 | REROUTE STATUS 54 | LOGICAL FAILOVER CIRCUIT ID 56 | # HOPS 58 | UTILIZATION 60 | QUALITY OF SERVICE (QoS) 62 | REROUTE PERIOD 64 |
|---|---|---|---|---|---|---|
| 66 101 | YES | 901 | 4 | 95 | UBR | 2h |
| 68 102 | YES | 902 | 3 | 80 | UBR | 4h |
| 70 103 | YES | 903 | 4 | 50 | VBR | 6h |

190

| | 52 LOGICAL CIRCUIT ID | 54 REROUTE STATUS | 56 LOGICAL FAILOVER CIRCUIT ID | 58 # HOPS | 60 UTILIZATION | 62 QUALITY OF SERVICE (QoS) | 64 REROUTE PERIOD |
|---|---|---|---|---|---|---|---|
| 66 | 101 | NO | 901 | 4 | 95 | UBR | 3h |
| 68 | 102 | NO | 902 | 3 | 80 | UBR | 5h |
| 70 | 103 | YES | 903 | 4 | 50 | VBR | 7h |

FIG. 6B

METHOD AND SYSTEM FOR AUTOMATICALLY TRACKING THE REROUTING OF LOGICAL CIRCUIT DATA IN A DATA NETWORK

CROSS-REFERENCE TO RELATED APPLICATIONS

The present application is related to U.S. patent application Ser. No. 10/348,077, entitled "Method and System for Obtaining Logical Performance Data for a Circuit in a Data Network," filed on Jan. 21, 2003, and U.S. patent application Ser. No. 10/348,592, entitled "Method and System for Provisioning and Maintaining a Circuit in a Data Network," filed on Jan. 21, 2003. This application is also related to U.S. patent application Ser. No. 10/745,117, entitled "Method And System For Providing A Failover Circuit For Rerouting Logical Circuit Data In A Data Network," filed on Dec. 23, 2003, U.S. patent application Ser. No. 10/745,047, entitled "Method And System For Automatically Renaming Logical Circuit Identifiers For Rerouted Logical Circuits In A Data Network," filed on Dec. 23, 2003, U.S. patent application Ser. No. 10/745,170, entitled "Method And System For Automatically Identifying A Logical Circuit Failure In A Data Network," filed on Dec. 23, 2003, and U.S. patent application Ser. No. 10/744,921, entitled "Method And System For Automatically Rerouting Logical Circuit Data In A Data Network," filed on Dec. 23, 2003, All of the above-referenced applications are assigned to the same assignee as the present application and are expressly incorporated herein by reference.

TECHNICAL FIELD

The present invention relates to the routing of data using logical circuits in a data network. More particularly, the present invention is related to automatically tracking the rerouting of logical circuit data in a data network.

BACKGROUND OF THE INVENTION

Data networks contain various network devices, such as switches, for sending and receiving data between two locations. For example, frame relay and Asynchronous Transfer Mode ("ATM") networks contain interconnected network devices that allow data packets or cells to be channeled over a circuit through the network from a host device to a remote device. For a given network circuit, the data from a host device is delivered to the network through a physical circuit such as a T1 line that links to a switch of the network. The remote device that communicates with the host through the network also has a physical circuit to a switch of the network. A network circuit also includes a logical circuit which includes a variable communication path for data between the switches associated with the host and the remote device.

In large-scale networks, the host and remote end devices of a network circuit may be connected across different local access and transport areas ("LATAs") which may in turn be connected to one or more Inter-Exchange Carriers ("IEC") for transporting data between the LATAs. These connections are made through physical trunk circuits utilizing fixed logical connections known as Network-to-Network Interfaces ("NNIs").

Periodically, failures may occur to the trunk circuits or the NNIs of network circuits in large-scale networks causing lost data. Currently, such network circuit failures are handled by dispatching technicians on each end of the network circuit (i.e., in each LATA) in response to a reported failure. The technicians manually access a logical element module to troubleshoot the logical circuit portion of the network circuit. The logical element module communicates with the switches in the data network and provides the technician with the status of the logical connections which make up the logical circuit. Once the technician determines the status of a logical connection at one end of a logical circuit (e.g., the host end), the technician then must access a network database to determine the location of the other end of the logical circuit so that its status may also be ascertained. If the technician determines the logical circuit is operating properly, the technician then accesses a physical element module to troubleshoot the physical circuit portion of the network circuit to determine the cause of the failure and then repair it. If, while troubleshooting a network circuit, the technician determines that a network circuit will be "down" (i.e., losing data) for an extended time period, the technician may manually reroute the data from a failed network circuit to an available unused or "backup" network circuit while the failed network circuit is being repaired.

Current methods of repairing network circuits, however, do not include tracking of rerouted network circuits. For example, while repairing a network circuit, data may be rerouted to a backup circuit having an identification which is different than the original network circuit which failed. In order to access this information, a technician would be required to manually access the network database to lookup the identification of the failed network circuit and cross-reference this information with data obtained from the logical element module to identify the backup circuit used for rerouting network circuit data. Moreover, there is currently no way to monitor or track the performance of backup network circuits over time such that underperforming or over-utilized backup circuits may be identified.

It is with respect to these considerations and others that the present invention has been made.

SUMMARY OF THE INVENTION

In accordance with the present invention, the above and other problems are solved by a method and system for automatically tracking the rerouting of logical circuit data in a data network. One method includes generating current reroute statistics upon the rerouting of logical circuit data from one or more failed logical circuits to one or more logical failover circuits in the data network. The current reroute statistics include trap data received for the one or more failed logical circuits in the data network. The method further includes generating a table for presenting the current reroute statistics without manual intervention and generating updated rerouted statistics which include updated trap data received for the one or more failed logical circuits in the data network. The method further includes updating the table with the updated reroute statistics without manual intervention.

The above-described method may further include generating a billing report including the updated reroute statistics. The updated reroute statistics may be generated upon the restoration of the one or more failed logical circuits in the data network. Each of the one or more failed logical circuits and each of the one or more logical failover circuits in the data network may be identified by a logical circuit identifier. The trap data may include the logical identifier for each of the one or more failed logical circuits and the logical identifier for each of the one or more logical failover circuits. The trap data may further include a current utilization of each of the one or more logical failover circuits. The trap data may further include the number of hops taken by data in each of the one or more logical failover circuits. The trap data may further include quality of service parameters for each of the one or more logical failover circuits. The quality of service parameters may include an unspecified bit rate, a variable bit rate, and a committed bit rate.

The logical circuit identifiers may be data link connection identifiers ("DLCIs") or virtual path/virtual circuit identifiers ("VPI/VCIs"). The logical circuits may be either permanent virtual circuits ("PVCs") or switched virtual circuits ("SVCs"). The data network may be either a frame relay network or an asynchronous transfer mode ("ATM") network.

In accordance with other aspects, the present invention relates to a system for automatically tracking the rerouting of logical circuit data in a data network. The system includes one or more network devices for rerouting logical circuit data between one or more failed logical circuits to one or more logical failover circuits in the data network, a logical element module, in communication with network devices, for receiving trap data generated by network devices, and a network management module in communication with the logical element module. The network management module is utilized for generating current reroute statistics upon the rerouting of logical circuit data from the one or more failed logical circuits to the one or more logical failover circuits. The current reroute statistics include the trap data received by the logical element module. The network management module is further utilized for generating a table for presenting the current reroute statistics without manual intervention and generating updated reroute statistics. The updated reroute statistics include the trap data received from the logical element module. The network management module is further utilized for updating the table with the updated reroute statistics without manual intervention.

The network management module may be further operative to generate a billing report including the updated trap data. The updated trap data may be generated upon the restoration of the one or more failed logical circuits in the data network. Each of the one or more failed logical circuits and each of the one or more logical failover circuits in the data network may be identified by a logical circuit identifier. The trap data may include the logical identifier for each of the one or more failed logical circuits and the logical identifier for each of the one or more logical failover circuits. The trap data may include a current utilization of each of the one or more logical failover circuits. The trap data may include the number of hops taken by each of the one or more logical failover circuits. The trap data may include quality of service parameters for each of the one or more logical failover circuits. The quality of service parameters may include an unspecified bit rate, a variable bit rate, and a committed bit rate. The logical circuit identifiers may be data link connection identifiers ("DLCIs") or virtual path/virtual circuit identifiers ("VPI/VCIs").

These and various other features as well as advantages, which characterize the present invention, will be apparent from a reading of the following detailed description and a review of the associated drawings.

DETAILED DESCRIPTION OF THE INVENTION

Embodiments of the present invention provide for a method and system for automatically tracking the rerouting of logical circuit data in a data network. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
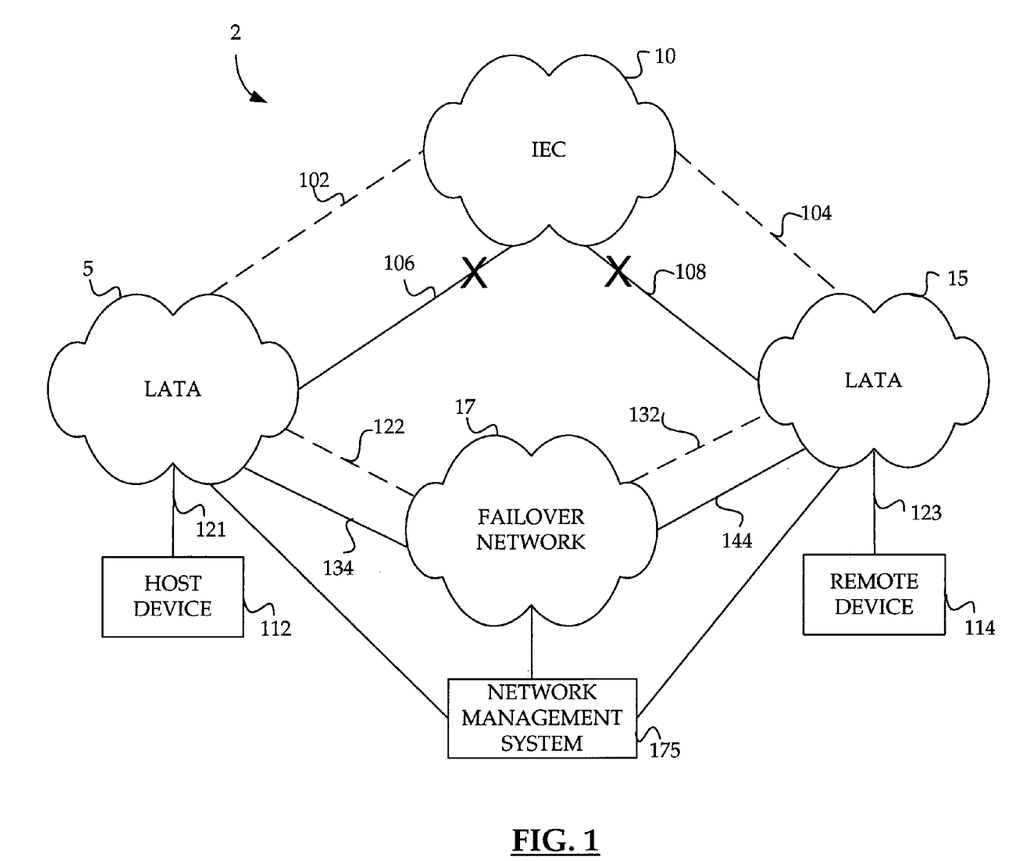
FIG. 1 illustrates a data network according to an embodiment of the invention.
Figure 2:
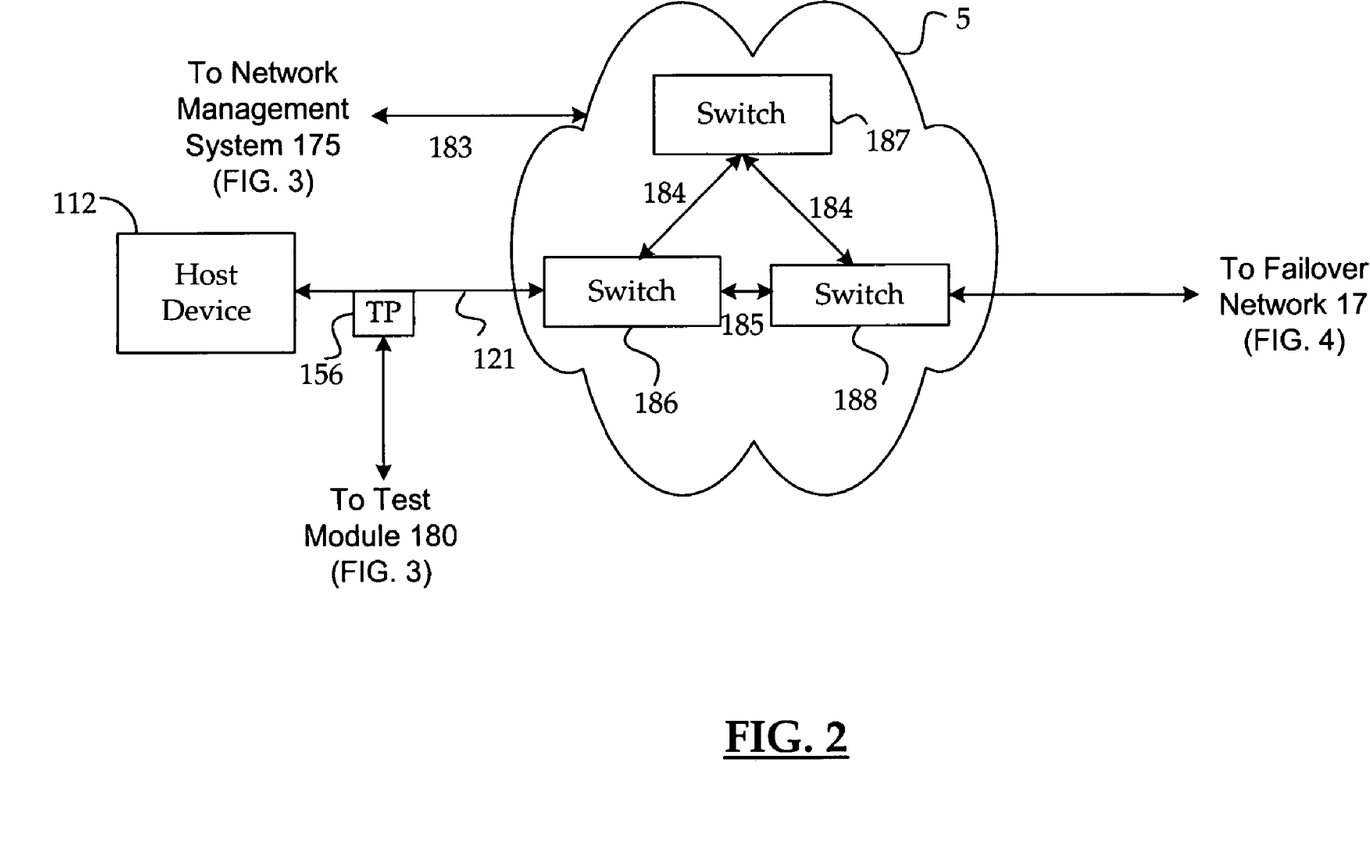
FIG. 2 illustrates a local access and transport area ("LATA") in the data network of FIG. 1, according to an embodiment of the invention.

Embodiments of the present invention may be generally employed in a data network 2 as shown in FIG. 1. The data network 2 includes local access and transport areas ("LATAs") 5 and 15 which are connected by an Inter-Exchange Carrier ("IEC") 10. It should be understood that the LATAs 5 and 15 may be data networks operated by a commonly owned Local Exchange Carrier ("LEC"). It should be further understood that the IEC 10 may include one or more data networks which may be operated by a commonly owned IEC. It will be appreciated by those skilled in the art that the data network 2 may be a frame relay network, asynchronous transfer mode ("ATM") network, or any other network capable of communicating data conforming to Layers 2-4 of the Open Systems Interconnection ("OSI") model developed by the International Standards Organization, incorporated herein by reference. It will be appreciated that these networks may include, but are not limited to, communications protocols conforming to the Multiprotocol Label Switching Standard ("MPLS") networks and the Transmission Control Protocol/Internet Protocol ("TCP/IP"), which are known to those skilled in the art.

The data network 2 includes a network circuit which channels data between a host device 112 and a remote device 114 through the LATA 5, the IEC 10, and the LATA 15. It will be appreciated by those skilled in the art that the host and remote devices 112 and 114 may be local area network ("LAN") routers, LAN bridges, hosts, front end processors, Frame Relay Access Devices ("FRADs"), or any other device with a frame relay, ATM, or network interface. It will be further appreciated that in the data network 2, the LATAs 5 and 15 and the IEC 10 may include network elements (not shown) which support interworking to enable communications between host and remote devices supporting dissimilar protocols. Network elements in a data network supporting interworking may translate frame relay data packets or frames sent from a host FRAD to ATM data packets or cells so that a host device may communicate with a remote device having an ATM interface. The LATAs 5 and 15 and the IEC 10 may further include one or more interconnected network elements, such as switches (not shown), for transmitting data. An illustrative LEC data network will be discussed in greater detail in the description of FIG. 2 below.

The network circuit between the host device 112 and the remote device 114 in the data network 2 includes a physical circuit and a logical circuit. As used in the foregoing description and the appended claims, a physical circuit is defined as the physical path that connects the end point of a network circuit to a network device. For example, the physical circuit of the network circuit between the host device 112 and the remote device 114 includes the physical connection 121 between the host device 112 and the LATA 5, the physical connection 106 between the LATA 5 and the IEC 10, the physical connection 108 between the IEC 10 and the LATA 15, and the physical connection 123 between the LATA 15 and the remote device 114. Routers and switches within the LATAs 5 and 15 and the IEC 10 carry the physical signal between the host and remote end devices 112 and 114 through the physical circuit.

It should be understood that the host and remote devices may be connected to the physical circuit described above using user-to-network interfaces ("UNIs"). As is known to those skilled in the art, an UNI is the physical demarcation point between a user device (e.g, a host device) and a public data network. It will further be understood by those skilled in the art that the physical connections 106 and 108 may include trunk circuits for carrying the data between the LATAs 5 and 15 and the IEC 10. It will be further understood by those skilled in the art that the connections 121 and 123 may be any of various physical communications media for communicating data such as a 56 Kbps line or a T1 line carried over a four-wire shielded cable or over a fiber optic cable.

As used in the foregoing description and the appended claims, a logical circuit is defined as a portion of the network circuit wherein data is sent over variable communication data paths or logical connections established between the first and last network devices within a LATA or IEC network and over fixed communication data paths or logical connections between LATAs (or between IECs). Thus, no matter what path the data takes within each LATA or IEC, the beginning and end of each logical connection between networks will not change. For example, the logical circuit of the network circuit in the data network may 2 include a variable communication path within the LATA 5 and a fixed communication path (i.e., the logical connection 102) between the LATA 5 and the IEC 10. It will be understood by those skilled in the art that the logical connections 102 and 104 in the data network 2 may include network-to-network interfaces ("NNIs") between the last sending switch in a LATA and the first receiving switch in an IEC.

As is known to those skilled in the art, each logical circuit in a data network may be identified by a unique logical identifier. In frame relay networks, the logical identifier is called a Data Link Connection Identifier ("DLCI") while in ATM networks the logical identifier is called a Virtual Path Identifier/Virtual Circuit Identifier ("VPI/VCI"). In frame relay networks, the DLCI is a 10-bit address field contained in the header of each data frame and contains identifying information for the logical circuit as well as information relating to the destination of the data in the frame, quality of service ("QoS") parameters, and other service parameters for handling network congestion. For example, in the data network 2 implemented as a frame relay network, the designation DLCI 100 may be used to identify the logical circuit between the host device 112 and the remote device 114. It will be appreciated that in data networks in which logical circuit data is communicated through more than one carrier (e.g., an LEC and an IEC) the DLCI designation for the logical circuit may change in a specific carrier's network. For example, in the data network 2, the designation DLCI 100 may identify the logical circuit in the LATA 5 and LATA 15 but the designation DLCI 800 may identify the logical circuit in the IEC 10.

Illustrative QoS parameters which may be included in the DLCI include a Variable Frame Rate ("VFR") real time parameter and a VFR non-real time parameter. As is known to those skilled in the art, VFR real time is a variable data rate for frame relay data frames communicated over a logical circuit. Typically, VFR real-time circuits are able to tolerate small variations in the transmission rate of data (i.e., delay) and small losses of frames. Typical applications for VFR real time circuits may include, but are not limited to, voice and some types of interactive video. VFR non-real time circuits also communicate data frames at a variable data rate but are able to tolerate higher variations in the transmission rate and thus more delay as these circuits are typically "bursty" (i.e., data is transmitted in short, uneven spurts) in nature. Typical applications for VFR non-real time circuits include, but are limited to, inter-LAN communications and Internet traffic.

Other service parameters which may be included in the DLCI include a Committed Information Rate ("CIR") parameter and a Committed Burst Size ("Bc") parameter. As is known to those skilled in the art, the CIR represents the average capacity of the logical circuit and the Bc represents the maximum amount of data that may be transmitted. It will be appreciated that the logical circuit may be provisioned such that when the CIR or the Bc is exceeded, the receiving switch in the data network will discard the frame. It should be understood that the logical circuit parameters are not limited to CIR and Bc and that other parameters known to those skilled in the art may also be provisioned, including, but not limited to, Burst Excess Size ("Be") and Committed Rate Measurement Interval ("Tc").

In ATM networks, the VPI/VCI is an address field contained in the header of each ATM data cell and contains identifying information for the logical circuit as well as information specifying a data cell's destination, QoS parameters, and specific bits which may indicate, for example, the existence of congestion in the network and a threshold for discarding cells. Illustrative QoS parameters which may be included in the VPI/VCI include a Committed Bit Rate ("CBR") parameter, a Variable Bit Rate ("VBR") parameter, and an Unspecified Bit Rate ("UBR") parameter. As is known to those skilled in the art, CBR defines a constant data rate for ATM cells communicated over a logical circuit. Typically, CBR circuits are given the highest priority in a data network and are very intolerant to delay. Typical applications for CBR circuits may include, but are not limited to, video conferencing, voice, television and video-on demand. VBR circuits communicate ATM cells at a variable data rate and are able to tolerate varying degrees of delay. Similar to frame relay variable service parameters, VBR circuits may be further subdivided into VBR real time and VBR non-real time. VBR non-real time circuits are able to tolerate more delay. Typical applications for ATM VBR circuits may include the same applications as frame relay VFR circuits. UBR circuits communicate ATM cells at an unspecified bit rate and are extremely tolerant to delay. UBR circuits are typically reserved for non-time sensitive applications such as file transfer, email, and message and image retrieval.

It should be understood that the logical circuit in the data network 2 may be a permanent virtual circuit ("PVC") available to the network at all times or a temporary or a switched virtual circuit ("SVC") available to the network only as long as data is being transmitted. It should be understood that the data network 2 may further include additional switches or other interconnected network elements (not shown) creating multiple paths within each LATA and IEC for defining each PVC or SVC in the data network. It will be appreciated that the data communicated over the logical connections 102 and 104 may be physically carried by the physical connections 106 and 108.

The data network 2 may also include a failover network 17 for rerouting logical circuit data, according to an embodiment of the invention. The failover network 17 may include a network failover circuit including physical connections 134 and 144 and logical connections 122 and 132 for rerouting logical circuit data in the event of a failure in the network circuit between the host device 112 and the remote device 114. The failover network 17 will be described in greater detail in the description of FIG. 4 below. The data network 2 may also include a network management system 175 in communication with the LATA 5, the LATA 15, and the failover network 17. The network management system 175 may be utilized to obtain status information for the logical and physical circuit between the host device 112 and the remote device 114. The network management system 175 may also be utilized for rerouting logical data in the data network 2 between the host device 112 and the remote device 114. The network management system 175 will be discussed in greater detail in the description of FIG. 3 below.

FIG. 2 illustrates the LATA 5 in the data network 2 described in FIG. 1 above, according to an embodiment of the present invention. As shown in FIG. 2, the LATA 5 includes interconnected network devices such as switches 186, 187, and 188. It will be appreciated that the data network 2 may also contain other interconnected network devices and elements (not shown) such as digital access and cross connect switches ("DACS"), channel service units ("CSUs"), and data service units ("DSUs"). As discussed above in the description of FIG. 1, the connection data paths of a logical circuit within a data network may vary between the first and last network devices in a data network. For example, as shown in FIG. 2, the logical circuit in the LATA 5 may include the communication path 185 between the switches 186 and 188 or the communication path 184 between the switches 186, 187, and 188. As discussed above, it should be understood that the actual path taken by data through the LATA 5 is not fixed and may vary from time to time, such as when automatic rerouting takes place.

It will be appreciated that the switches 186, 187, and 188 may include a signaling mechanism for monitoring and signaling the status of the logical circuit in the data network 2. Each time a change in the status of the logical circuit is detected (e.g., a receiving switch begins dropping frames), the switch generates an alarm or "trap" which may then be communicated to a management station, such as a logical element module (described in detail in the description of FIG. 3 below), in the network management system 175. In one embodiment, the signaling mechanism may be in accord with a Local Management Interface ("LMI") specification, which provides for the sending and receiving of "status inquiries" between a data network and a host or remote device. The LMI specification includes obtaining status information through the use of special management frames (in frame relay networks) or cells (in ATM networks). In frame relay networks, for example, the special management frames monitor the status of logical connections and provide information regarding the health of the network. In the data network 2, the host and remote devices 112 and 114 receive status information from the individual LATAs they are connected to in response to a status request sent in a special management frame or cell. The LMI status information may include, for example, whether or not the logical circuit is congested or whether or not the logical circuit has failed. It should be understood that the parameters and the signaling mechanism discussed above are optional and that other parameters and mechanisms may also be utilized to obtain connection status information for a logical circuit.

Figure 3:
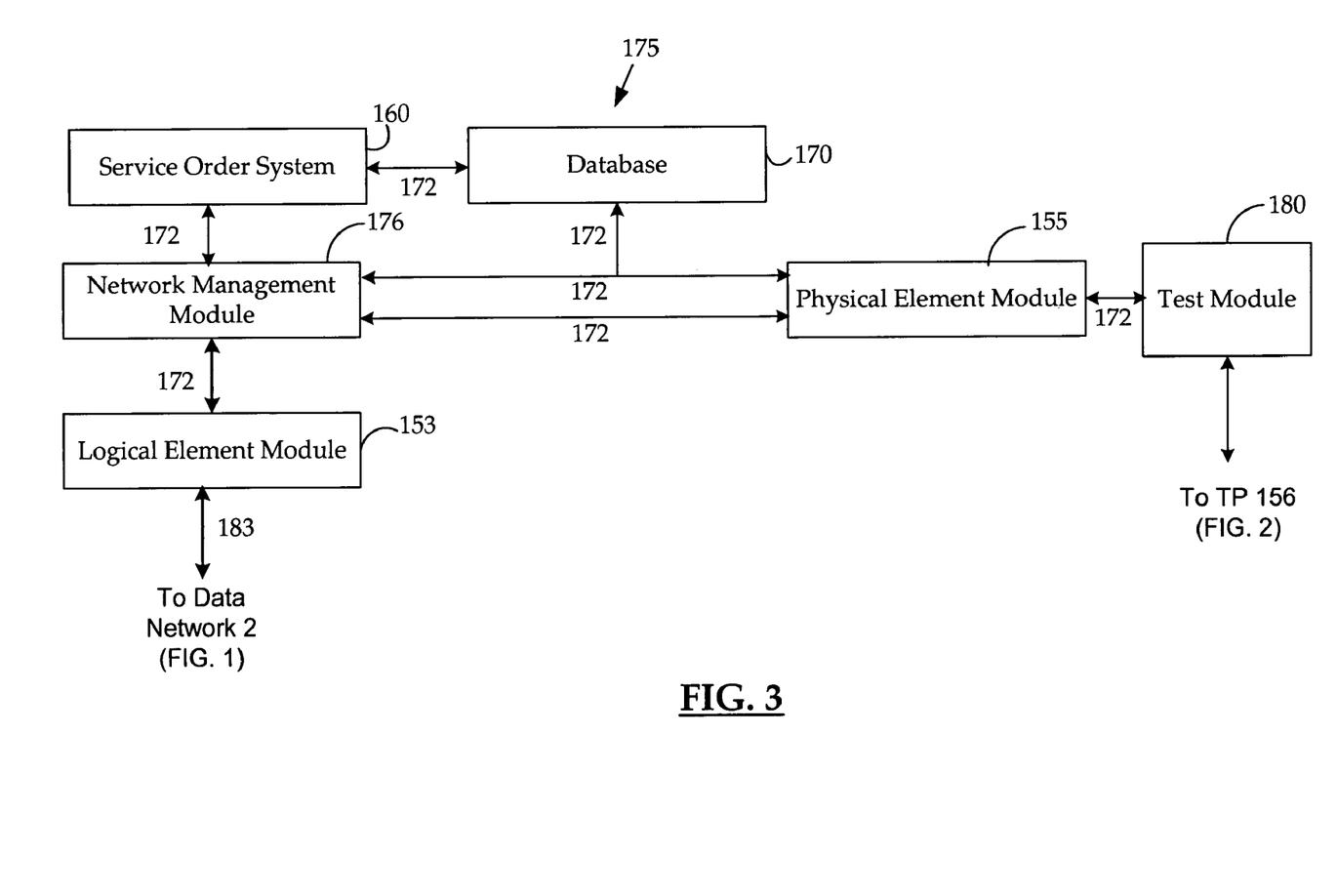
FIG. 3 illustrates a network management system which may be utilized to automatically rename logical circuit identifiers for rerouted logical circuits in the data network of FIG. 1, according to an embodiment of the invention.

FIG. 3 illustrates the network management system 175 which may be utilized to automatically track reroute statistics during the rerouting of logical circuit data in the data network 2 of FIG. 1, according to an embodiment of the invention. The network management system 175 includes a service order system 160, a network database 170, a logical element module 153, a physical element module 155, a network management module 176, and a test module 180. The service order system 160 is utilized in the data network 2 for receiving service orders for provisioning network circuits. The service order includes information defining the transmission characteristics (i.e., the logical circuit) of the network circuit. The service order also contains the access speed, CIR, burst rates, and excess burst rates. The service order system 160 communicates the service order information to a network database 170 over management trunk 172. The network database 170 assigns and stores the parameters for the physical circuit for the network circuit such as a port number on the switch 186 for transmitting data over the physical connection 121 to and from the host device 112.

The network database 170 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, N.J. The network database 170 may also be in communication with a Work Force Administration and Control system ("WFA/C") (not shown) used to assign resources (i.e., technicians) to work on installing the physical circuit.

The network management system 175 also includes the logical element module 153 which is in communication with the switches in the data network 2 through management trunks 183. The logical element module 153 runs a network management application program to monitor the operation of logical circuits which includes receiving trap data generated by the switches which indicate the status of logical connections. The trap data may be stored in the logical element module 153 for later analysis and review. The logical element module 153 is also in communication with the network database 170 via management trunks 172 for accessing information stored in the network database 170 regarding logical circuits, such as the logical circuit identifier data. The logical circuit identifier data may include, for example, the DLCI or VPI/VCI header information for each data frame or cell in the logical circuit including the circuit's destination and service parameters. The logical element module 153 may consist of terminals (not shown) that display a map-based graphical user interface ("GUI") of the logical connections in the data network. An illustrative logical element module is the NAVIS-CORE™ system marketed by LUCENT TECHNOLOGIES, Inc. of Murray Hill, N.J.

The network management system 175 further includes the physical element module 155 in communication with the physical connections of the network circuit via management trunks (not shown). The physical element module 155 runs a network management application program to monitor the operation and retrieve data regarding the operation of the physical circuit. The physical element module 155 is also in communication with the network database 170 via management trunks 172 for accessing information regarding physical circuits, such as line speed. Similar to the logical element module 153, the physical logical element module 155 may also consist of terminals (not shown) that display a map-based GUI of the physical connections in the LATA 5. An illustrative physical element module is the Integrated Testing and Analysis System ("INTAS"), marketed by TELECORDIA™ TECHNOLOGIES, Inc. of Morristown, N.J., which provides flow-through testing and analysis of telephony services.

The physical element module 155 troubleshoots the physical connections for a physical circuit by communicating with test module 180, which interfaces with the physical connections via test access point 156. The test module 180 obtains the status of the physical circuit by transmitting "clean" test signals to test access point 156 (shown in FIG. 2) which "loops back" the signals for detection by the test module 180. It should be understood that there may multiple test access points on each of the physical connections for the physical circuit.

The network management system 175 further includes the network management module 176 which is in communication with the service order system 160, the network database 170, the logical element module 153, and the physical element module 155 through communications channels 172. It should be understood that in one embodiment, the network management system 176 may also be in communication with the LATA 15, the IEC 10, and the failover network 17. The communications channels 172 may be on a LAN. The network management module 176 may consist of terminals (not shown), which may be part of a general-purpose computer system that displays a map-based GUI of the logical connections in data networks. The network management module 175 may communicate with the logical element module 153 and the physical element module 155 using a Common Object Request Broker Architecture ("CORBA"). As is known to those skilled in the art, CORBA is an open, vendor-independent architecture and infrastructure which allows different computer applications to work together over one or more networks using a basic set of commands and responses. The network management module 176 may also serve as an interface for implementing logical operations to provision and maintain network circuits. The logical operations may be implemented as machine instructions stored locally or as instructions retrieved from the logical and physical element modules 153 and 155. An illustrative method detailing the provisioning and maintenance of network circuits in a data network is presented in U.S. patent application Ser. No. 10/348,592, entitled "Method And System For Provisioning And Maintaining A Circuit In A Data Network," filed on Jan. 23, 2003, and assigned to the same assignee as this application, which is expressly incorporated herein by reference. An illustrative network management module is the Broadband Network Management System® ("BBNMS") marketed by TELECORDIA™ TECHNOLOGIES, Inc. of Morristown, N.J.

The network management module 176 may also serve as an interface with the logical element module 153 to receive and store trap data indicating the status of the logical connections comprising logical circuits in the data network 2. It will be appreciated that the network management module 176 may further be configured to compile historical statistics for logical circuits based on an analysis of stored trap data. These historical statistics may include, for example, QoS parameters for logical circuits, number of "hops" contained within a logical circuit, and the utilization of logical circuits (i.e., the extent to which logical circuits are being used) in the data network 2. As used in the foregoing description and the appended claims, a "hop" is the journey that data packets (or cells) make from one network device to another network device along a logical circuit. For example, in the LATA 5 of the data network 2 (FIG. 2), the logical circuit originating from the host device 112 the communication path 184 includes two hops between the switches 186, 187, and 188 while the communication path 185 includes one hop between the switches 186 and 188. It will be appreciated that utilization may be represented as a percentage corresponding to logical circuit usage at a given point in time or over a period of time. For example, if a logical circuit supports a T-1 data transmission rate (i.e., 1.544 megabits per second) but, on average, is used to support a data transmission rate of 772 kilobits per second), the logical circuit is only 50% utilized. It will be appreciated that logical circuits with utilizations approaching 100% may suffer congestion some percentage of the time. This may occur, for example, when the maximum data transmission rate (e.g., the Committed Burst Size or Bc) for a logical circuit is maintained over an extended period of time.

Figure 4:
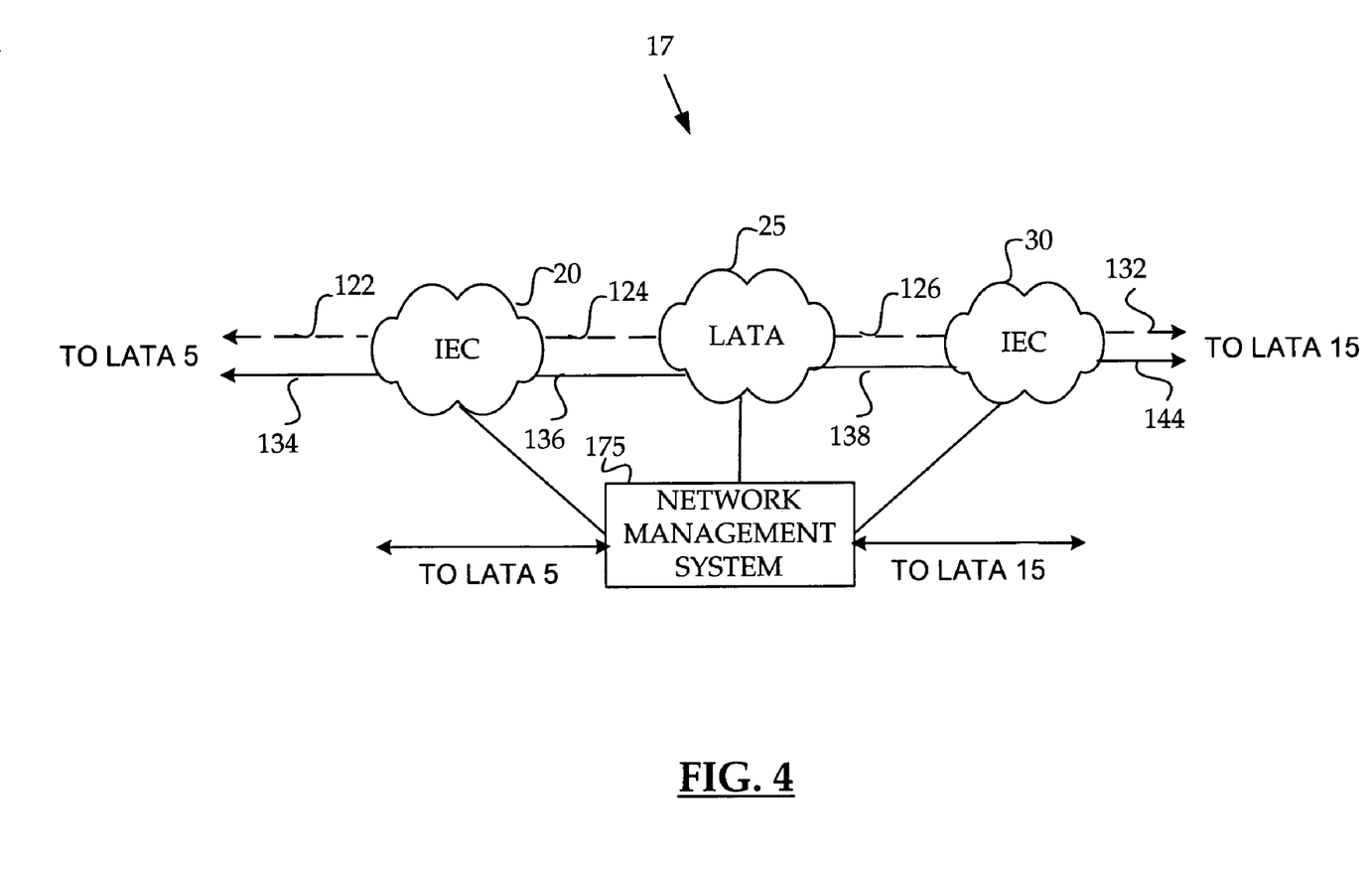
FIG. 4 illustrates a failover data network for rerouting logical circuit data, according to an embodiment of the invention.

FIG. 4 illustrates an illustrative failover data network for rerouting logical circuit data, according to one embodiment of the present invention. As shown in FIG. 4, the failover network 17 includes an IEC 20, a LATA 25, and an IEC 30. The failover network further includes a network failover circuit which includes a physical failover circuit and a logical failover circuit. The physical failover circuit includes the physical connection 134 between the LATA 5 (shown in FIG. 1) and the IEC 20, the physical connection 136 between the IEC 20 and the LATA 25, the physical connection 138 between the LATA 25 and the IEC 30, and the physical connection 144 between the IEC 30 and the LATA 15 (shown in FIG. 1). Similarly, the logical failover circuit may include the logical connection 122 between the LATA 5 (shown in FIG. 1) and the IEC 20, the logical connection 124 between the IEC 20 and the LATA 25, the logical connection 126 between the LATA 25 and the IEC 30, and the logical connection 132 between the IEC 30 and the LATA 15 (shown in FIG. 1). It should be understood that in one embodiment, the network failover circuit illustrated in the failover network 17 may include a dedicated physical circuit and a dedicated logical circuit provisioned by a network service provider serving the LATAs 5, 15, and 25 and the IECs 20 and 30, for rerouting logical data from a failed logical circuit.

Figure 5:
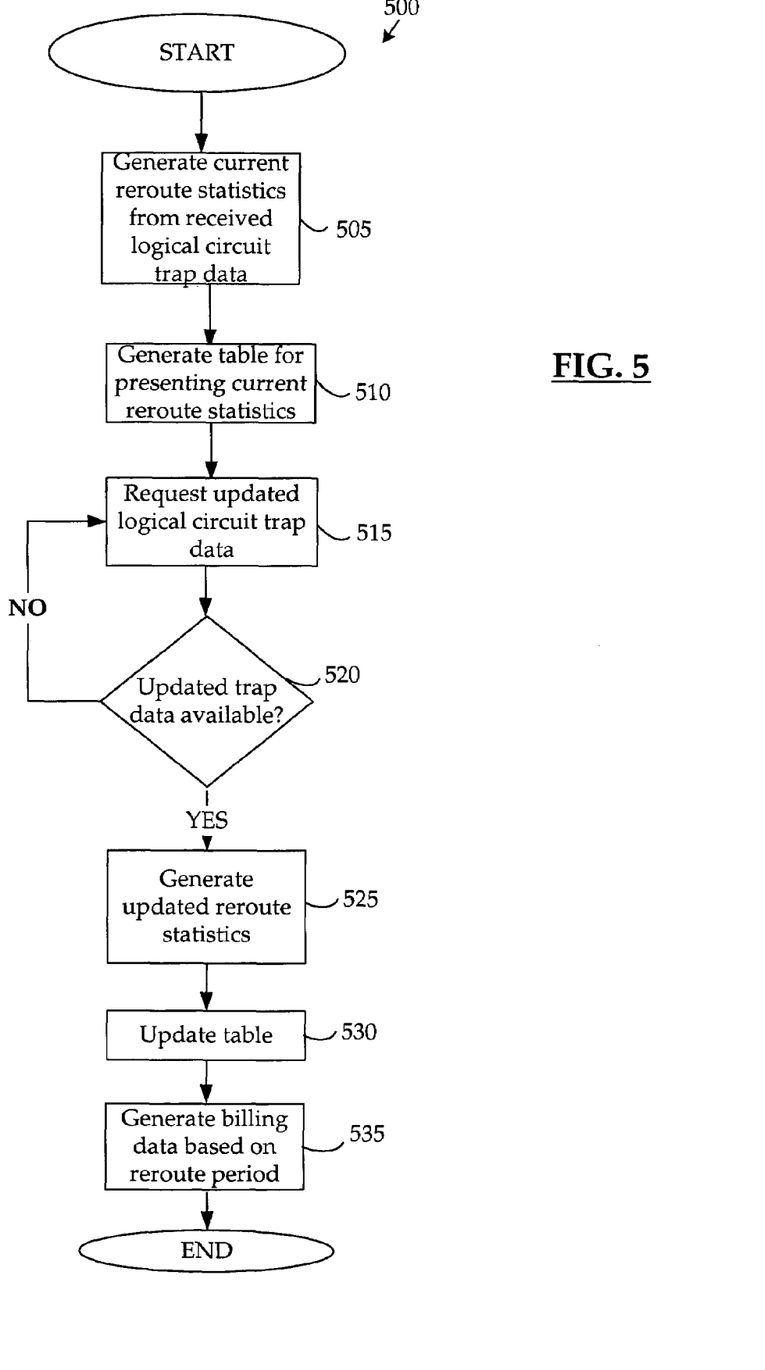
FIG. 5 is a flowchart describing logical operations performed by the network management system for automatically tracking the rerouting of logical circuit data in the data network of FIG. 1, according to an embodiment of the invention.

FIG. 5 is a flowchart describing logical operations 500 performed by the network management system 175 for automatically tracking the rerouting of logical circuit data in a data network, according to an embodiment of the invention. It will be appreciated that the logical operations 500 may be initiated when data is rerouted from a logical circuit to a logical failover circuit (e.g., a logical failover circuit in the failover network 17) by the network management module 176. It will be appreciated that the network management module 176 may be configured and utilized to automatically detect logical circuit failures and reroute logical circuit data from the failed logical circuits in a data network. An illustrative method detailing the automatic monitoring of logical circuits to identify a logical circuit failure in a data network is presented in co-pending U.S. patent application Ser. No. 10/745,170, entitled "Method And System For Automatically Identifying A Logical Circuit Failure In A Data Network," filed on Dec. 23, 2003, and assigned to the same assignee as this application, which is expressly incorporated herein by reference. An illustrative method detailing the rerouting of logical circuit data to a logical failover circuit is presented in co-pending U.S. patent application Ser. No. 10/744,921, entitled "Method And System For Automatically Rerouting Logical Circuit Data In A Data Network," filed on Dec. 23, 2003, and assigned to the same assignee as this application, which is expressly incorporated herein by reference.

The logical operations 500 begin at operation 505 where the network management module 176 generates current reroute statistics from trap data received for failed logical circuits being rerouted in the data network 2. As discussed above in the description of FIGS. 2 and 3, trap data is generated by the switches in the data network 2 and includes status information for logical circuits such as the current status of a logical circuit (i.e., whether or not the failed logical circuit has been restored), QoS parameters, current utilization of logical failover circuits, and other logical circuit service parameters. The trap data also includes logical circuit identification information.

In the data network 2, the trap data generated by the switches is generated in "real-time" and communicated to the logical element module 153 thus are not generally stored by the switches themselves but rather are communicated to the logical element module 153 via management trunks 183 (FIG. 2) where the trap data is kept in a temporary storage buffer. As a result, once the temporary storage buffer is full, old trap data is overwritten with new trap data. The network management module 176, in communication with the logical element module 153 via management trunk 172 (FIG. 3) is configured to receive and collect the trap data from the logical element module 153 generated by one or more switches and generate "reroute statistics" detailing the status of rerouted logical circuit data in the data network 2. The reroute statistics may include the reroute status of the logical circuit data (i.e., whether the failed logical circuit has been restored), the logical circuit identification of the failed logical circuit (i.e., the DLCI or VPI/VCI), the logical circuit identification of the logical failover circuit, the number of hops taken by the logical failover circuit, the utilization of the logical failover circuit, and the QoS parameters of the logical failover circuit.

As discussed briefly above, the network management module 176 may be configured to automatically reroute logical circuit data from a failed logical circuit to a logical failover circuit in the data network 2. During the reroute of logical circuit data, the network management module 176 may also be configured to rename the logical circuit identifier assigned to a failed logical circuit to the logical circuit identifier assigned to a corresponding logical failover circuit until the failed logical circuit has been restored. An illustrative method detailing the renaming of logical circuit identifiers is presented in co-pending U.S. patent application Ser. No. 10/745,047, entitled "Method And System For Automatically Renaming Logical Circuit Identifiers For Rerouted Logical Circuits In A Data Network," filed on Dec. 23, 2003, and assigned to the same assignee as this application, which is expressly incorporated herein by reference.

Figure 6A:
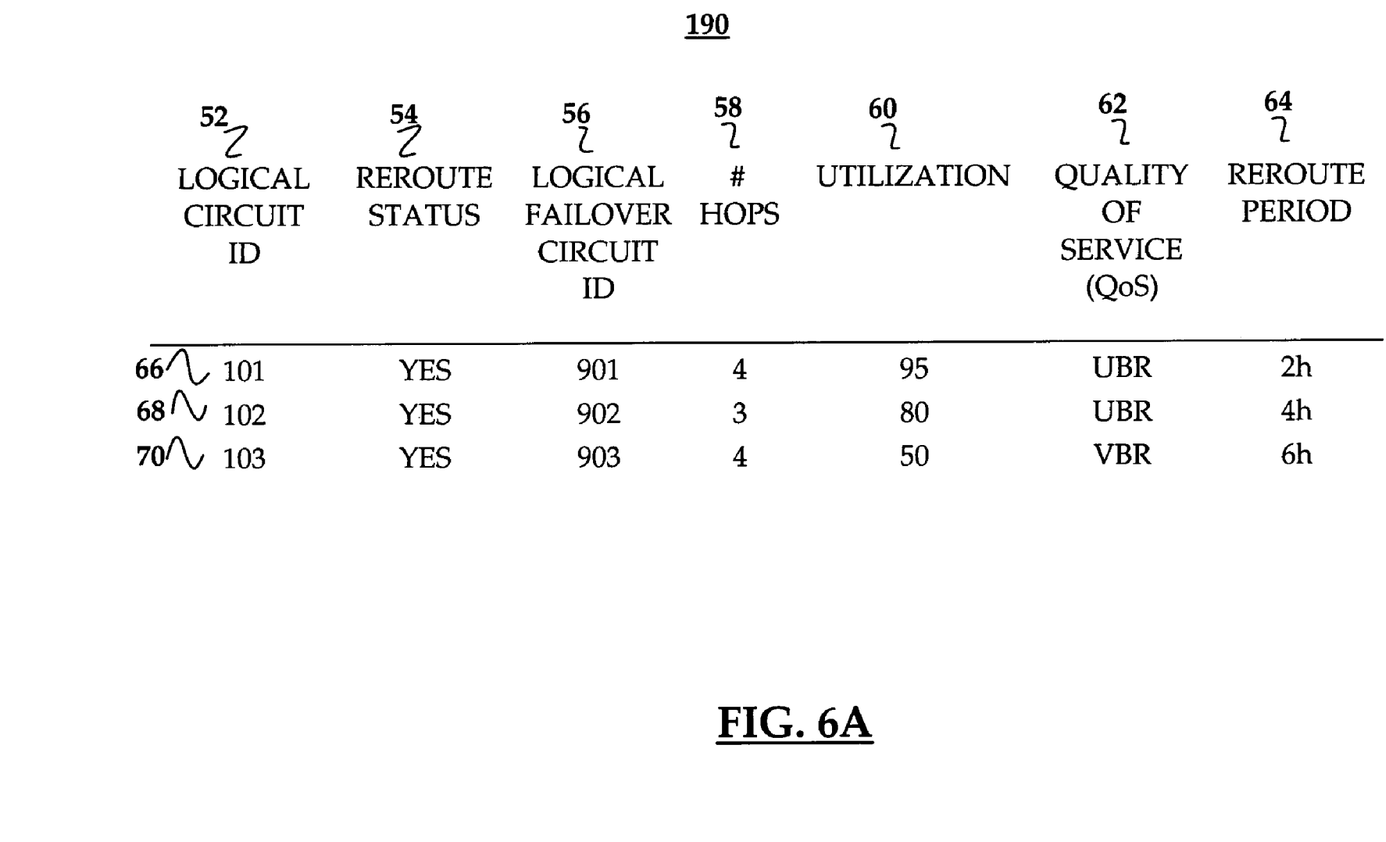
FIG. 6A is a table presenting current reroute statistics which may be generated by the network management module of FIG. 3 in the data network of FIG. 1, according to an embodiment of the invention.

The logical operations 500 continue from operation 505 to operation 510 where the network management module 176 generates a table for presenting the current reroute statistics generated at operation 505. It will be appreciated that the table may be presented in an electronic format so that it is graphically displayed on one or more display terminals of the network management module 176. FIG. 6A is a table presenting current reroute statistics which may be generated for rerouted logical circuits in the data network 2, according to an embodiment of the invention. The table will be discussed in greater detail in the description of FIG. 6A below.

The logical operations 500 then continue from operation 510 to operation 515 where the network management module 176 receives updated trap data for currently rerouted logical circuits from the logical element module 153. The updated trap data may include, for example, information that a previously failed logical circuit is successfully communicating data in the data network 2. The logical operations 500 then continue from operation 515 to operation 520 where the network management module 176 requests updated trap data. The updated trap data may indicate, for example, that one or more logical circuits have been restored in the data network 2. If no updated trap data is available, then the logical operations 500 return to operation 515 where the network management module 176 waits to receive further updated trap data. If, however, updated trap data is available to be received by the network management module 176, then the logical operations 500 continue from operation 520 to operation 525.

Figure 6B:
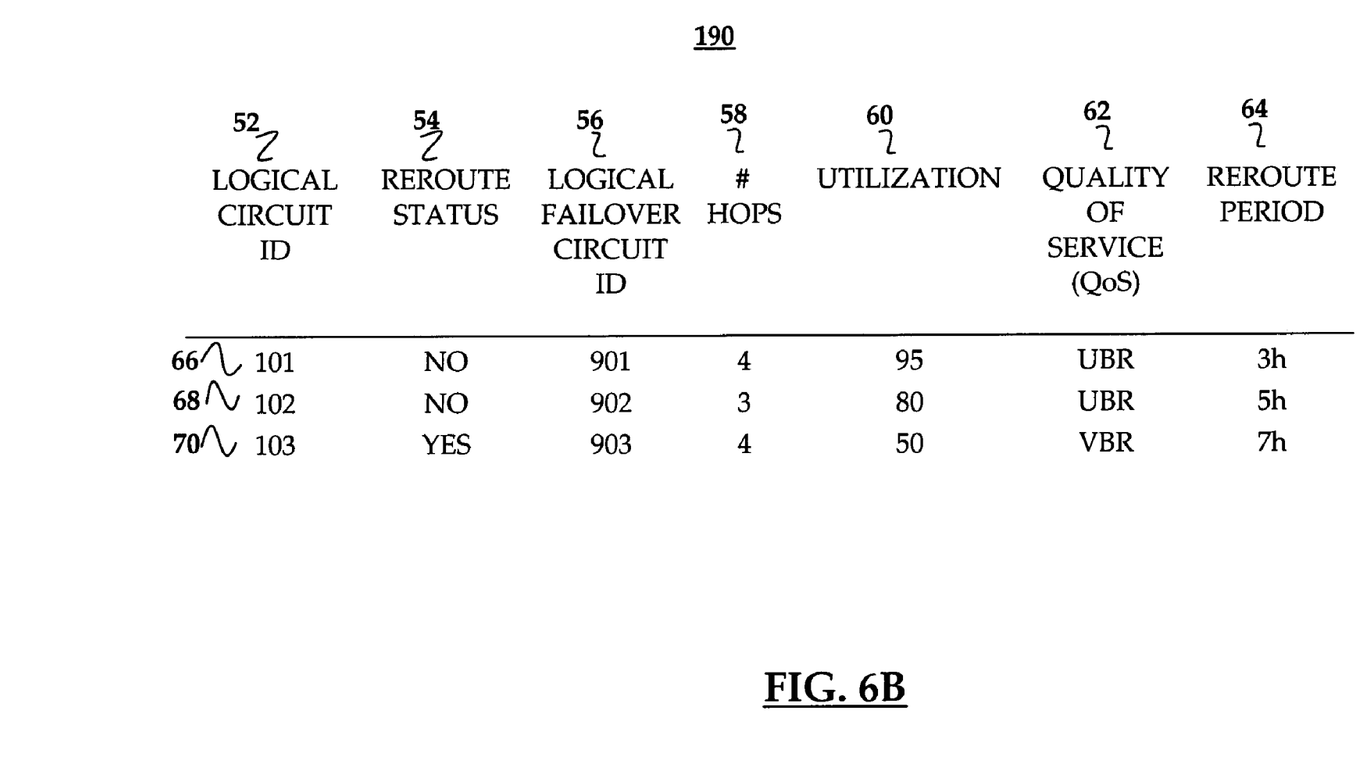
FIG. 6B is a table presenting updated reroute statistics which may be generated by the network management module of FIG. 3 in the data network of FIG. 1, according to an embodiment of the invention.

At operation 525, the network management module 176 generates updated reroute statistics based on the received updated trap data and then updates the table (generated at operation 510) at operation 530. FIG. 6B is a table presenting updated reroute statistics which may be generated for rerouted logical circuits in the data network 2, according to an embodiment of the invention. The table will be discussed in greater detail in the description of FIG. 6B below. The logical operations 500 then continue at operation 535.

At operation 535, the network management module 176 generates billing data based on the time period logical circuit data was rerouted to a logical failover circuit in the data network 2. It will be appreciated that the network management module 176 may be configured to record the time period logical circuit data from failed logical circuits are rerouted in a data network. Once the failed logical circuit is restored, the network management module may generate a bill for an affected customer based on the time the logical circuit data was rerouted. The logical operations 500 then end.

FIG. 6A is a table 190 presenting current reroute statistics which may be generated by the network management module 176 for rerouted logical circuits in the data network 2, according to an embodiment of the invention. As shown in FIG. 6, the table includes a LOGICAL CIRCUIT ID column 52, a REROUTE STATUS column 54, a LOGICAL FAILOVER CIRCUIT ID column 56, a # HOPS column 58, a UTILIZATION column 60, a QUALITY OF SERVICE (QoS) column 62, and a REROUTE PERIOD column 64. The LOGICAL CIRCUIT ID column 52 lists the logical circuit IDs for logical circuits belonging to one or more network circuit customers in the data network 2. The REROUTE STATUS column 54 lists whether or not each of the logical circuits in the LOGICAL CIRCUIT ID column 52 is currently being rerouted. The LOGICAL FAILOVER CIRCUIT ID column 56 lists the logical circuit IDs for logical failover circuits which may be utilized for rerouting data from the logical circuits listed in the LOGICAL CIRCUIT ID column 52. The # HOPS column 58 lists the number of hops taken by data being communicated through the logical failover circuits identified in the LOGICAL FAILOVER CIRCUIT ID column 56. The UTILIZATION column 60 lists the utilization percentage of the logical failover circuits identified in the LOGICAL FAILOVER CIRCUIT ID column 56 by rerouted logical circuit data. The QoS column 62 lists the quality of service offered for rerouted data by each of the logical failover circuits identified in the LOGICAL FAILOVER CIRCUIT ID column 56. The REROUTE PERIOD column 64 lists the amount of time the data from each of the logical circuits identified in the LOGI- CAL CIRCUIT ID column 52 has been rerouted to the logical failover circuits identified in the LOGICAL FAILOVER CIRCUIT ID column 56.

For example, the table 190 indicates in row 66 that the logical circuit identified as 101 is currently being rerouted to a logical failover circuit identified as 901, that the logical failover circuit includes four hops, that the logical failover circuit is 95% utilized, that logical failover circuit has a QoS of UBR, and that the data has been rerouted for two hours in the data network. It will be appreciated that the reroute statistics listed in the table 190 may be used by a network circuit provider to improve the management of rerouted logical circuit data in a data network. For example, a technician may notice that the logical failover circuit 901 is 95% utilized and thus subject to congestion (i.e., lost data packets or cells). As a result, the technician may initiate a subsequent reroute of the logical circuit data to another available failover logical circuit to minimize the possibility of customer data loss.

FIG. 6B is a table 190 presenting updated reroute statistics which may be generated by the network management module 176 for rerouted logical circuits in the data network 2, according to an embodiment of the invention. As shown in the table 190, the updated reroute statistics indicate that the data communicated by logical circuit IDs 101 and 102 are no longer being rerouted, and that the reroute period for each circuit was three hours and five hours, respectively at a QoS of UBR. It will be appreciated that a network circuit customer may use the updated reroute statistics in the table 190 to more effectively manage logical circuit rerouting in the data network. For example, if the logical circuit identified as 101 is normally at a CBR QoS, a customer may not desire to have high quality logical circuit data (such as video conferencing data) rerouted to the lower quality UBR logical failover circuit 901 if the logical circuit 101 fails. Since high quality data (such as video conferencing data) is typically intolerant to the delay inherent in UBR circuits, the customer may direct the network circuit provider to reroute data from the logical circuit 101 only to CBR or VBR logical failover circuits (if available).

It will be appreciated that the embodiments of the invention described above provide for a method and system for automatically tracking the rerouting of logical circuit data in a data network. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for automatically tracking the rerouting of logical circuit data in a data network, the method comprising:
   generating current reroute statistics upon the rerouting of logical circuit data from one or more failed logical circuits to one or more logical failover circuits in the data network, the current reroute statistics including trap data received for the one or more failed logical circuits in the data network, wherein the trap data includes a committed information rate or a committed burst size;
   generating a table for presenting the current reroute statistics without manual intervention;
   generating updated rerouted statistics, the updated reroute statistics including updated trap data received for the one or more failed logical circuits in the data network, wherein generating updated rerouted statistics comprises detecting a change in the status of the logical circuit by determining if a frame has been dropped, where the frame is dropped when the committed information rate or the committed burst size has been exceeded; and
   updating the table with the updated reroute statistics without manual intervention,
   wherein the current reroute statistics comprise trap data generated in real-time and communicated to a logical element module and not stored in switches that generated the trap data, and
   wherein each of the one or more failed logical circuits and each of the one or more logical failover circuits in the data network is identified by a logical circuit identifier that is renamed until the one or more failed logical circuits has been restored.

2. The method of claim 1 further comprising generating a billing report including the updated reroute statistics.

3. The method of claim 1, wherein the updated reroute statistics are generated upon the restoration of the one or more failed logical circuits in the data network.

4. The method of claim 1, wherein the trap data comprises the logical identifier for each of the one or more failed logical circuits and the logical identifier for each of the one or more logical failover circuits.

5. The method of claim 1, wherein the trap data comprises a current utilization of each of the one or more logical failover circuits.

6. The method of claim 1, wherein the trap data comprises the number of hops taken by each of the one or more logical failover circuits.

7. The method of claim 1, wherein the trap data comprises a quality of service parameter for each of the one or more logical failover circuits.

8. The method of claim 7, wherein the quality of service parameter comprises at least one of:
   an unspecified bit rate;
   a variable bit rate; and
   a committed bit rate.

9. The method of claim 1, wherein the logical circuit identifier is a data link connection identifier (DLCI).

10. The method of claim 1, wherein the logical circuit identifier is a virtual path/virtual circuit identifier (VPI/VCI).

11. The method of claim 1, wherein at least one of the one or more logical circuits is a permanent virtual circuit.

12. The method of claim 1, wherein at least one of the one or more logical failover circuits is a permanent virtual circuit.

13. The method of claim 1, wherein at least one of the one or more logical circuits is a switched virtual circuit.

14. The method of claim 1, wherein at least one of the one or more logical failover circuits is a switched virtual circuit.

15. The method of claim 1, wherein the data network is a frame relay network.

16. The method of claim 1, wherein the data network is an asynchronous transfer mode (ATM) network.

17. A system for automatically tracking the rerouting of logical circuit data in a data network, the system comprising:
   at least one network device for rerouting logical circuit data between one or more failed logical circuits to one or more logical failover circuits in the data network, wherein each of the one or more failed logical circuits and each of the one or more logical failover circuits in the data network is identified by a logical circuit identifier that is renamed when the until the one or more failed logical circuits has been restored;
   a logical element module, in communication with the at least one network device, for receiving trap data that includes a committed information rate or a committed burst size, the trap data generated by the at least one network device, wherein receiving the trap data generated by the at least one network device comprises receiving the trap data in real-time; and a network management module, in communication with the logical element module, for:

generating current reroute statistics upon the rerouting of logical circuit data from the one or more failed logical circuits to the one or more logical failover circuits, the current reroute statistics including the trap data received by the logical element module;

generating a table for presenting the current reroute statistics without manual intervention;

generating updated reroute statistics, the updated reroute statistics including the trap data received from the logical element module, wherein generating updated reroute statistics comprises detecting a change in the status of the logical circuit by determining if a frame has been dropped, where the frame is dropped when the committed information rate or the committed burst size has been exceeded; and updating the table with the updated reroute statistics without manual intervention.

18. The system of claim 17 wherein the network management module is further operative to generate a billing report including the updated trap data.

19. The system of claim 17, wherein the updated trap data is generated upon the restoration of the one or more failed logical circuits in the data network.

20. The system of claim 17, wherein the trap data comprises the logical identifier for each of the one or more failed logical circuits and the logical identifier for each of the one or more logical failover circuits.

21. The system of claim 17, wherein the trap data comprises a current utilization of each of the one or more logical failover circuits.

22. The system of claim 17, wherein the trap data comprises the number of hops taken by each of the one or more logical failover circuits.

23. The system of claim 17, wherein the trap data comprises a quality of service parameter for each of the one or more logical failover circuits.

24. The system of claim 23, wherein the quality of service parameter comprises at least one of:

an unspecified bit rate;
a variable bit rate; and
a committed bit rate.

25. The system of claim 17, wherein the logical circuit identifier is a data link connection identifier (DLCI).

26. The system of claim 17, wherein the logical circuit identifier is a virtual path/virtual circuit identifier (VPI/VCI).

* * * * *